United States Patent
Brant et al.

(10) Patent No.: US 10,583,395 B2
(45) Date of Patent: Mar. 10, 2020

(54) FORWARD OSMOSIS SUBSURFACE IRRIGATION SYSTEM AND PROCESS

(71) Applicant: KC Harvey Environmental, LLC, Bozeman, MT (US)

(72) Inventors: Jonathan A. Brant, Laramie, WY (US); Kevin Harvey, Bozeman, MT (US)

(73) Assignee: KC Harvey Environmental, LLC, Bozeman, MT (US)

( * ) Notice: Subject to any disclaimer, the term of this patent is extended or adjusted under 35 U.S.C. 154(b) by 89 days.

(21) Appl. No.: 16/040,865

(22) Filed: Jul. 20, 2018

(65) Prior Publication Data

US 2019/0022586 A1 Jan. 24, 2019

Related U.S. Application Data

(60) Provisional application No. 62/535,034, filed on Jul. 20, 2017.

(51) Int. Cl.
*B01D 61/00* (2006.01)
*B01D 61/36* (2006.01)
(Continued)

(52) U.S. Cl.
CPC ........... *B01D 61/005* (2013.01); *A01G 25/06* (2013.01); *B01D 61/58* (2013.01); *B01D 69/04* (2013.01); *C02F 1/441* (2013.01); *C02F 1/442* (2013.01); *C02F 1/444* (2013.01); *C02F 1/445* (2013.01); *C02F 1/448* (2013.01); *C05B 17/00* (2013.01); *C05C 11/00* (2013.01); *B01D 61/025* (2013.01); *B01D 61/027* (2013.01); *B01D 61/145* (2013.01); *B01D 61/362* (2013.01); *B01D 2311/06* (2013.01); *B01D 2311/25* (2013.01); *C02F 2103/08* (2013.01)

(58) Field of Classification Search
CPC ................ A01G 25/06; B01D 2311/06; B01D 2311/25; B01D 61/005; B01D 61/025; B01D 61/027; B01D 61/145; B01D 61/362; B01D 61/58; B01D 69/04; C02F 1/441; C02F 1/442; C02F 1/444; C02F 1/445; C02F 1/448; C02F 2103/08; C05B 17/00; C05C 11/00
See application file for complete search history.

(56) References Cited

U.S. PATENT DOCUMENTS

2002/0130078 A1* 9/2002 Tonkin ................ A01G 27/006
　　　　　　　　　　　　　　　　　210/640
2009/0261040 A1* 10/2009 Pruet .................. B01D 17/0208
　　　　　　　　　　　　　　　　　210/650
(Continued)

*Primary Examiner* — Dirk R Bass
(74) *Attorney, Agent, or Firm* — Snell & Wilmer, LLP

(57) ABSTRACT

The present disclosure is directed to a forward osmosis system/process utilized primarily in conjunction with a subsurface irrigation system/process. Saline wastewater or naturally saline water is treated using forward osmosis membranes that draw at least partially purified water from the wastewater into an osmotic draw solution (draw solution). The resulting diluted osmotic draw solution is then circulated through the subsurface irrigation system including one or more tubular membranes that reject the draw solution while permitting water in the diluted draw solution to pass through.

17 Claims, 3 Drawing Sheets

(51) Int. Cl.
  *B01D 61/14* (2006.01)
  *B01D 61/02* (2006.01)
  *B01D 69/04* (2006.01)
  *B01D 61/58* (2006.01)
  *C02F 1/44* (2006.01)
  *C05B 17/00* (2006.01)
  *C05C 11/00* (2006.01)
  *A01G 25/06* (2006.01)
  *C02F 103/08* (2006.01)

(56) References Cited

U.S. PATENT DOCUMENTS

| | | | |
|---|---|---|---|
| 2011/0042315 A1* | 2/2011 | Parnas | B01D 61/362 210/640 |
| 2012/0061319 A1* | 3/2012 | Vandezande | B01D 67/0079 210/640 |
| 2013/0220927 A1* | 8/2013 | Moody | C02F 1/445 210/652 |
| 2014/0151300 A1* | 6/2014 | Savage | C02F 9/00 210/638 |

* cited by examiner

FORWARD OSMOSIS SUBSURFACE IRRIGATION SYSTEM AND PROCESS

CROSS REFERENCE

This application claims the benefit of the filing date of U.S. Provisional Application No. 62/535,034 having a filing date of Jul. 20, 2017, the entire contents of which is incorporated herein by reference.

BACKGROUND

Wastewater, as well as un-altered waters characterized by high salt concentrations (>1,000 mg/L), are generally referred to as saline water. Highly saline wastewaters are produced in an array of industrial applications including during the exploration for and production of oil and natural gas resources from subsurface formations. For example, the management of produced waters from oil and gas production is receiving growing scrutiny as the volumes that are now being generated in the United States alone are approaching 20 to 30 billion barrels per year. Produced waters can have total dissolved solids concentrations ranging from thousands to several hundred thousand mg/L. In addition, numerous natural sources of saline or brine water (e.g., brackish groundwater) exist that are not suitable for use without treatment.

The largest use of freshwater across the world is for the irrigation of crops for human and livestock food production. The continued growth of the world's population in conjunction with finite freshwater resources has increased the interest in reuse of 'impaired/waste' waters or waters naturally enriched with salts for irrigation of crops. The paradigm has shifted from considering these effluent streams as 'waste' to now seeing them as a valuable resource. Realizing the possibility of reusing brine/saline waters for some beneficial purpose requires that existing technical and economic challenges associated with desalination processes be overcome. For irrigation these challenges largely focus on the technical complexity, chemical inputs, and energy consumption required for desalination.

Aqueous solutions containing dissolved salts (e.g., brine/saline streams) are usually purified (desalinated) by ion exchange, pressure driven membrane processes (e.g., nanofiltration, reverse osmosis), mechanical distillation, and crystallizers. While effective, these technologies are highly energy intensive and require extensive infrastructure, and thus are costly. Accordingly, there has recently been significant interest in non-pressure driven membrane processes (forward osmosis, membrane distillation), which typically have lower energy requirements.

Forward osmosis is the transport of a solvent (e.g., water) across a water permeable membrane from a region of lower osmotic potential to a region of higher osmotic potential. During this process solutes (e.g., salts) are rejected by the membrane. Stated otherwise a feedwater solution (e.g., waste water) on one side of the membrane has a lower osmotic potential than the osmotic potential of a draw solution (e.g., osmotic agent) on an opposing side of the membrane. Water passes across the membrane to equalize the osmotic potential thereby concentrating the feedwater solution and diluting the draw solution. While effectively removing water from a wastewater stream, this process requires removal of the water from the draw solution prior to being put to a beneficial use. That is, producing desalinated water using a forward osmosis process requires two steps, forward osmosis membrane separation and separation of water from a diluted draw solution/osmotic agent. In conventional industrial settings, the first step is energy efficient, the second step is not.

Recovery or separation of water from the diluted draw solution typically requires considerable energy input. For instance, water is sometimes separated from draw solutions using reverse osmosis. In other instances, diluted draw solutions are distilled (e.g., boiled off) to remove the draw solution form the water or vice versa. The energy expended to separate the water from the draw solution often negates the benefits of the forward osmosis process. Accordingly, forward osmosis has not found widespread acceptance for wastewater recovery.

SUMMARY

The present disclosure is directed to a forward osmosis system/process utilized primarily in conjunction with a subsurface irrigation system/process. Saline wastewater or naturally saline water is treated using forward osmosis membranes that draw at least partially purified water from the wastewater into an osmotic draw solution (draw solution). The resulting diluted osmotic draw solution is then circulated through the subsurface irrigation system including one or more tubular membranes that reject the draw solution while permitting water in the diluted draw solution to pass through. The tubular membranes may be placed beneath the soil surface or on top of the soil surface in order to supply moisture to plant roots, similar to a conventional subsurface drip irrigation system. The tubular membranes allow the water to be drawn from the interior of the tubular membrane across the membrane and into the soil due to the differences in the energy gradient that exists between the diluted osmotic agent and the surrounding soil. This energy gradient induces mass transfer across the membrane due to the following mechanisms, the magnitude of all of which may vary with soil moisture and/or soil composition: vapor pressure, hydraulic pressure, osmotic potential, and the soil matric potential. Through this process nearly pure water (desalinated water) is extracted from the previously diluted draw solution and distributed into the soil media that surrounds the tubular irrigation membranes. The water is then transported through the soil where it may be taken up by vegetation through root systems, enter into the atmosphere through evaporation, or be stored within the soil matrix for some period of time. As the draw solution passes through the irrigation system it becomes re-concentrated, thereby increasing its osmotic potential. Once a desired osmotic potential is restored the draw solution is returned to the above ground forward osmosis system where the process begins again. Because the process relies primarily on chemical and vapor pressure gradients, rather than hydraulic pressure, to achieve mass (water) transfer the energy footprint of the system is minimal in comparison to other existing desalination technologies.

Presented herein is a forward osmosis system that utilizes an irrigation system to separate water from a diluted osmotic agent/draw solution. In one embodiment, a subsurface irrigation system incorporates tubular membranes that separate water from the draw solution. Such membranes are salt rejecting membranes in an embodiment. The soil water conditions (e.g., the sum of matric, osmotic, gravitational and pressure potentials) provide the primary force for separating the water from the draw solution. However, circulating pumps may also provide pressure differentials between the inside of the tubular membranes and the soil. Such pressure differentials are typically on the order of 10-30 psi. Thus, the system is still considered a low pressure system. In another embodiment, drip irrigation lines having tubular membranes may be run on the surface and solar energy may, in part, provide the force for separating the water from the draw solution. In any embodiment, the membranes utilize passive power inputs (e.g., soil water conditions, soil evaporation, plant transpiration, solar, etc.) to separate water from the draw solution. In addition to providing desalinated water, the process also efficiently re-concentrates the draw solution, which may be reused during the first step of the forward osmosis process.

The tubular membranes may be of a variety of types. For instance, in one arrangement, the tubular membranes may be ultrafiltration or nano-filtration membranes. In another arrangement the membranes are pervaporation-type membranes. In any arrangement, the membranes permit the passage of water through the membrane while preventing passage of the osmotic agent. Accordingly, the permeability of the membranes may be selected based on the osmotic agent and/or soil conditions where the membranes will be used to optimize the flux of water into the soil for plant growth. By way of example only, large molecular weight osmotic agents may permit use of 'looser' membranes that provide passage to larger molecules. For example, the membranes may be ultrafiltration membranes. Low molecular weight osmotic agents may require 'tighter' membranes. For example, the membranes may be nano-filtration membranes. Alternatively, the membranes may be pervaporation-type membranes. That is, in various embodiments, the membranes operate on a solution diffusion principle. In other embodiments the membranes operate on an ultrafiltration principle and/or a solution diffusion principle.

In another aspect, a method is provided for designing a subsurface irrigation system that utilizes a saline or tainted water as a feed source. The method includes providing a forward osmosis system for separating water from a feedstock (e.g., wastewater, brackish water) into a draw solution, which is diluted by the water. Once a predetermined minimum osmotic potential is reached in the diluted draw solution (e.g., as a result of dilution), it circulates through the tubular membrane(s) buried within the soil or positioned on the soil. Water is transported across the tubular, salt rejecting membranes through, for example, a solution diffusion mechanism. Water is transported down gradient where the gradient is a summation of multiple mechanisms, including: hydraulic pressure gradient, chemical or osmotic potential gradient, vapor pressure gradient, and through soil suction, which is a function of the soil matric potential. Typically, these membrane tubes are constructed as a thin-film composite structure where a thin active layer is supported by a macro-porous support layer. Salt rejection occurs at the active layer and the support structure provides physical support and protection for the active layer. The diluted draw solution is circulated through the buried membrane tubes, typically under low pressure (≤30 psi) though this is not a strict requirement. The membrane tubes reject the salt(s) that make-up the osmotic draw solution to provide water to the soil. A combination of the difference in pressure heads between the water inside the membrane tubes, osmotic gradient, the soil matric potential, and a difference in vapor pressure between the soil and feed water inside the tubular membrane, the evapotranspiration rate of water from the soil and the flux rate(s) of the membrane tubes dictate the size and spacing of the buried tubes. The draw solution is re-concentrated as the water moves into the soil.

DETAILED DESCRIPTION

Figure 1:
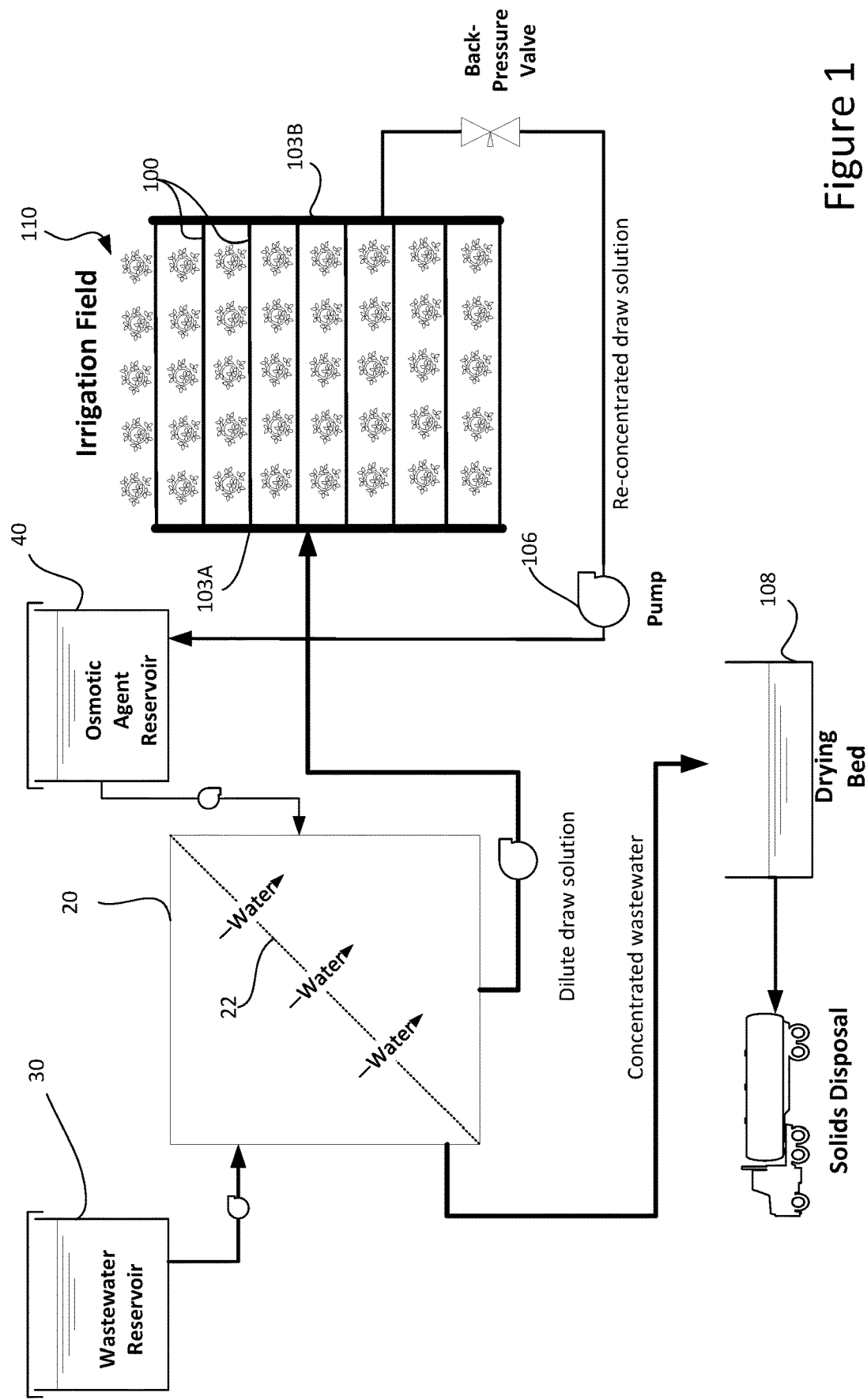
FIG. 1 illustrates a forward osmosis irrigation process.

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Forward osmosis (FO) is an osmotic process that, like reverse osmosis (RO), uses a membrane to effect separation of water from dissolved solutes. The driving force for this separation is an osmotic pressure gradient, such that a "draw solution" of high osmotic concentration (relative to that of the feed solution), is used to induce a net flow of water through the membrane into the draw solution, thus effectively separating the feed water from its solutes. In contrast, the reverse osmosis process uses hydraulic pressure as the driving force for separation, which serves to counteract the osmotic pressure gradient that would otherwise favor water flux from the permeate to the feed. Hence significantly more energy is required for reverse osmosis compared to forward osmosis.

An additional distinction between the reverse osmosis (RO) and forward osmosis (FO) processes is that the permeate water resulting from a RO process is, in most cases, fresh water ready for use. In the FO process, this is not the case. The membrane separation of the FO process in effect results in a trade between the solutes of the feed solution and the draw solution. Desalinated water can be produced from the diluted draw solution using a second process step. This has previously been done using pressurized membrane separation (e.g., RO), thermal methods (e.g., distillation), physical separation or a combination of these processes. The second process step has typically been energy intensive limiting the practical applicability for FO.

The present disclosure is directed to process where a FO system utilized in conjunction with a surface or subsurface irrigation system to recover water from a tainted water source. More specifically, high purity water from the tainted water source moves across a FO membrane into an osmotic draw solution, which dilutes the draw solution. The water is then removed from the diluted draw solution. In an embodiment, the diluted draw solution is circulated through the sub-surface irrigation system incorporating tubular membranes that separate water from the diluted draw solution. The tubular membranes utilize the soil conditions (e.g., matric potential) or solar energy/sunlight as the primary force for separating the water from the draw solution. The systems and processes allow for the use of water with high levels of dissolved solids (e.g., salts) for the irrigation of crops. One specific application is the use of waste water from produced oil and gas production wells, though this is not a requirement.

FIG. 1 illustrates one non-limiting embodiment of a combined forward osmosis and subsurface irrigation system. As shown, the system utilizes a forward osmosis system 20 connected to a source of wastewater or wastewater reservoir 30 and a source of an osmotic draw agent or osmotic agent reservoir 40. The wastewater feeds into a the FO system 20 on a first side of a forward osmosis membrane(s) 22 while the osmotic draw agent feeds into the FO system on an opposite side of the FO membrane(s) 22. As previously discussed, the osmotic draw agent has a higher osmotic potential than the wastewater resulting in pure water crossing the membrane as illustrated by the arrows in FIG. 1. The forward osmosis system devices may include variously configured chambers separated by one or more membranes. Often such chambers are co-axial allowing for a counter flow of a source water (e.g., wastewater) and a draw solution. The illustrated system of FIG. 1 is presented by way of illustration. It will be appreciated that variations of the FO system may be substituted as known by those skilled in the art. In any arrangement, the membrane 22 allows the passage of water but fundamentally inhibits the transfer of other species/solutes. When the chambers are filled with fluids of differing osmotic strength, water is drawn through the membrane from the fluid of lower osmotic strength to the fluid of higher osmotic strength. The fluid of higher osmotic strength is referred to as the "draw solution."

The passage of water across the FO membrane 22 dilutes the osmotic draw solution and concentrates the wastewater into a heavy brine for disposal. If the wastewater and osmotic draw solution were static in the FO system 20, the osmotic potential would eventually equalize across the membrane(s) 22 and the process would stop. However, in the presented system, the wastewater and/or osmotic agent may be provided in a flow (e.g., counter flow) which may be continuous, or which may be controlled by concentrations of these components. The result of the FO process is that the wastewater is concentrated into a brine for disposal and the osmotic draw solution is diluted. The concentrated wastewater could be returned to the wastewater reservoir. In other applications, the concentrated waste water may be diverted to drying beds 108. To make use of the desalinated water recovered from the wastewater, this water must be removed from the diluted osmotic draw solution.

Numerous different FO membranes may be utilized for the FO system. In an embodiment, an aquaporin flat sheet membrane is utilized. Such a FO membrane is available for Sterlitech of Kent Wash. Likewise, various different draw solutions may be utilized. In embodiment, the draw solution may be sodium chloride (e.g., salt water). In other embodiments, the draw solutions may further comprise fertilizers made varying combinations of nitrogen, phosphorus, and/or potassium. The use of fertilizers as a draw agent may allow for use with "looser" separation membranes (e.g., irrigation membranes) allowing the preferential passage of a portion of the fertilizes (e.g., nitrogen/phosphorus).

The process and system utilize draw solution separation membranes (e.g., salt rejecting membranes) buried in the soil to remove water from the diluted draw solution for beneficial use and to re-concentrate the draw solution for reuse. That is, the water is removed from the diluted draw solution, which had previously been recovered from the wastewater. The salt rejecting membranes provide substantially draw-solution-free water (e.g., desalinated water in an embodiment) directly to the root systems of cropped or natural vegetation. Along these lines, the salt rejecting membranes permit the passage of water into the soil while rejecting salts (e.g., draw solution) such that the osmotic agent (simple salts like sodium chloride) cannot pass into the soil.

In the illustrated embodiment, the salt rejecting membranes are membrane tubes 100 buried in the ground (i.e., in irrigation field 110) at a prescribed vertical depth and horizontal spacing between tubes, depending on crop water needs, soil characteristics and climate conditions. In general, the membrane tubes 100 will be laid out in a way similar to conventional subsurface drip irrigation systems. The network of tubes (i.e., irrigation field 110) will typically be connected by manifolds 103A, 103B and the inlet manifold 103A will be fed from the output of the forward osmosis system 20. The inlet manifold 103A receives the diluted (low osmotic potential) draw solution. The system may rely on gravity and/or a pump to feed the diluted draw solution to the irrigation field 110. In some arrangements, one or more pumps 106 may be included to cycle the diluted draw solution through the system at a predetermined flow rate and hydraulic pressure ranging from, for example, 10 to 30 psi. The draw solution will be returned to the osmotic agent reservoir 40 after passing through the irrigation field 110 when a maximum osmotic potential is achieved. That is, circulating the diluted draw solution through the irrigation field 110 removes water from the draw solution. This works to re-concentrate the osmotic draw solution such that it may be reused. If necessary, the diluted osmotic draw solution could be recirculated until enough water passes through the salt rejecting membranes to re-concentrate the draw solution to a predetermined concentration.

For an application where pervaporation membranes form the separation membranes, the pervaporation membranes are hydrophilic while also rejecting salts so that these salts (e.g., draw agent) cannot pass into the soil. Salt rejection typically occurs through the differences in solubility and diffusion rates between the water molecules and salts. The driving force for pervaporation is the partial pressure difference of the permeating component between the feed and permeate sides of the membrane. That is, one or more gradients (e.g., vapor, osmotic, salt etc.), between the feed and permeate sides of the membrane, drive the process. The pervaporation membranes are "hydrophilic" meaning that the pervaporation membranes are non-porous, absorb water, and allow the absorbed water to pass through. The pervaporation membranes are considered as being non-porous, in the traditional sense of the word used by membrane scientists, in that any opening through the pervaporation membrane is generally less than about 10 nanometers (nm). Such a spacing is roughly the distance between polymer chains in polymeric materials forming the pervaporation membrane.

The vapor/condensate passing into the soil is evaporated directly from the soil or is taken up by the plant roots and transpired through the plant stomata into the atmosphere which aids in maintaining a low vapor pressure on the permeate side of the pervaporation membrane. This in turn maintains water transport across the pervaporation membrane. Water is supplied to the soil much in the same way that regular irrigation water is delivered to the soil by way of subsurface drip irrigation. The primary difference being that the irrigation tubing buried beneath the soil surface is comprised of a hydrophilic membrane material which allows for pervaporation of water into the soil without the concurrent transport of dissolved solids (e.g., salts). That is, water is transported across the membrane, from the tube interior containing the dilute draw solution to the surrounding soil environment or permeate side. This process is driven by, among other things, the vapor pressure gradient between the tube interior and the surrounding soil environment. The liquid water within the irrigation tube interior has a higher vapor pressure than does the unsaturated soil (containing primarily water vapor) that surrounds the pervaporation tube, i.e. water moves through the membrane from the wetter interior side of the tube to the drier soil side. In this system, the water vapor/condensate supplied to the soil is removed from the soil through two mechanisms: (1) uptake by plant roots and transpiration from plant stomata into the atmosphere during plant growth, and (2) evaporation from the soil surface into the surrounding atmosphere.

Pervaporation materials include, without limitation, cellulose triacetate (CTA), cellulose acetate, polyvinyl alcohol (PVA) and modified polyamide (PA) to name a few. Various hydrophilic materials that permit permeation through the active membrane and its evaporation into the vapor phase may be used. To maintain structural integrity, the active layer membranes requires a minimum thickness. The thickness may be reduced if the active membrane is supported by a thicker and more porous support layer.

Figure 2:
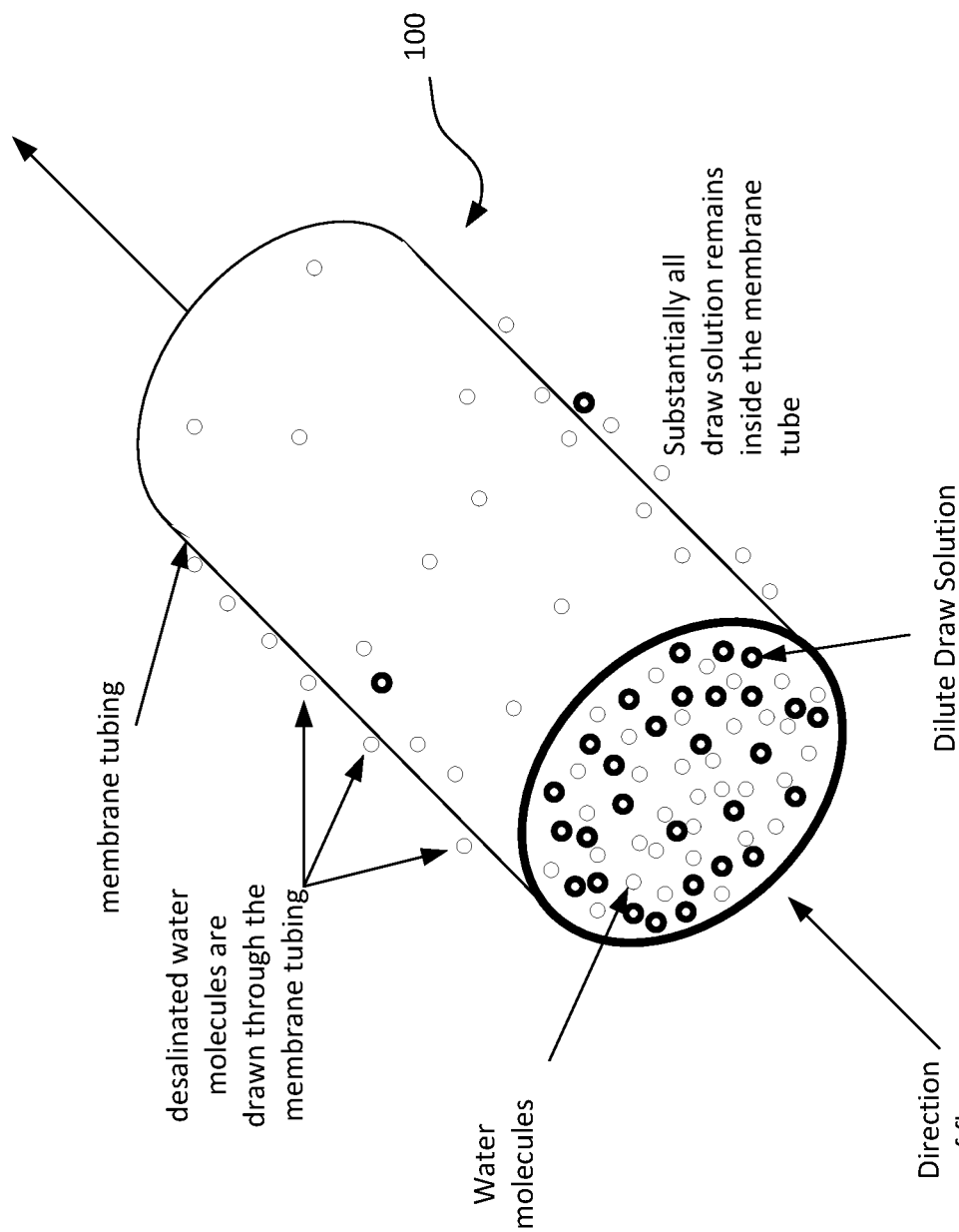
FIG. 2 illustrates a perspective view of a tubular membrane.
Figure 3:
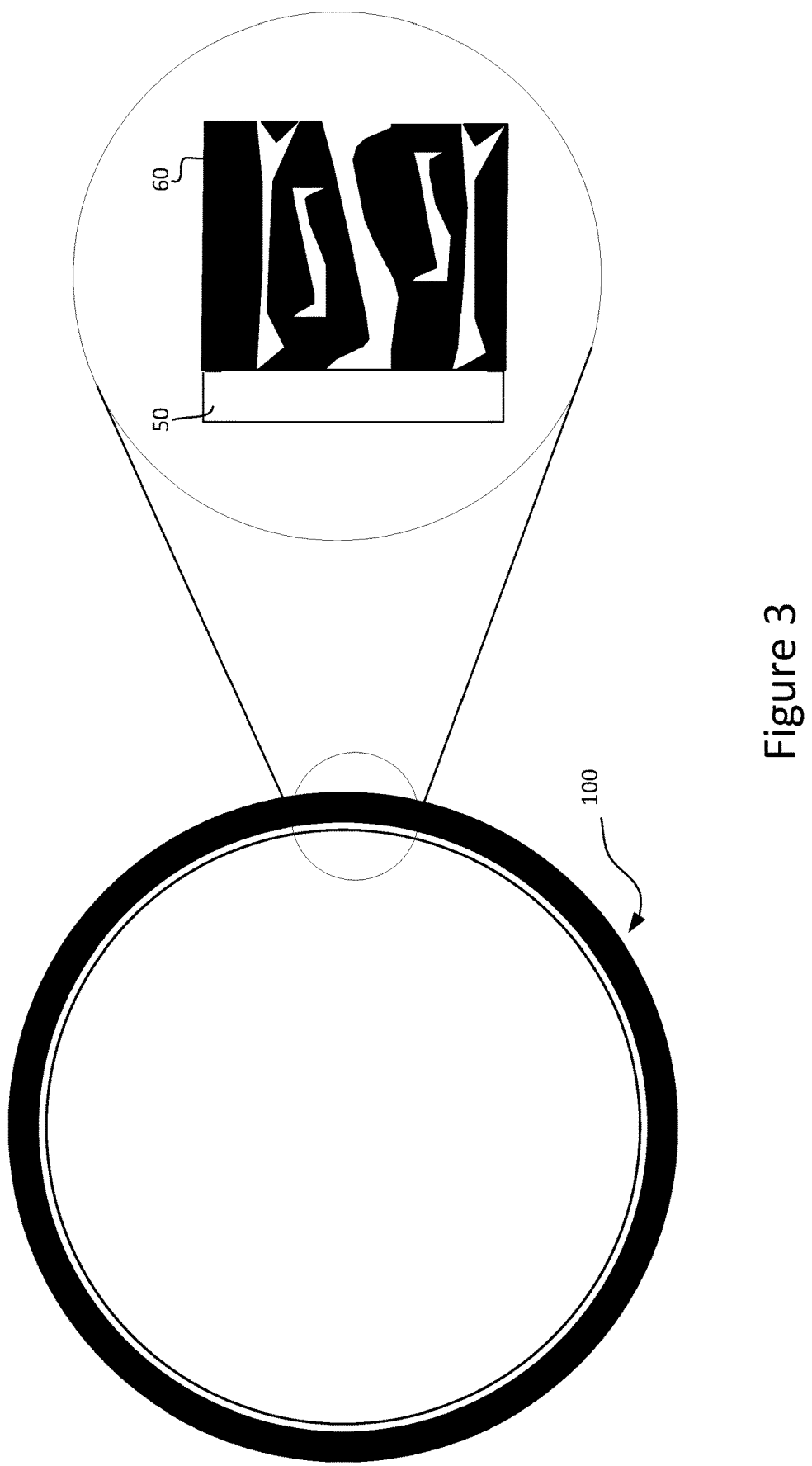
FIG. 3 illustrates a cross-sectional view of a tubular membrane.

In another embodiment, semi-permeable membranes are utilized. These semi-permeable membranes are designed to take advantage of the hydraulic and chemical potential gradients that exist between the feed solution (diluted osmotic solution) and the soil matrix that surrounds the tubular membrane. As noted the hydraulic pressure of the feed solution may range up to 30 psi resulting in a net pressure gradient across the membrane of up to about 25 psi. Furthermore, the chemical potential gradients that will exist between the feed solution and the soil will arise due to differences in osmotic potential, vapor pressure, and the natural soil-water, or suction, potential of the soil media. Taking advantage of these combined gradients is a membrane design based on the combined properties of low-pressure/high rejection reverse osmosis membranes and forward osmosis membranes. Here, a thin (thickness <100 nm) active layer 50 characterized as highly hydrophilic is placed (attached) to a macroporous support structure 60. See FIGS. 2 and 3. The support structure is also characterized by high hydrophilicity to prevent its dewetting over time following exposure to the soil media. In a second design the thickness of the active layer is increased (>1 mm) and no support structure is used. The use of the support structure is a function of soil type and site conditions (over burden pressure) as these determine amongst other things the type(s) of mass transport mechanisms and the required intimacy of contact needed between the membrane and soil. For both membrane designs water transport across the active (salt rejecting) layer through solution diffusion down the chemical/hydraulic gradient from the feed solution and into the surrounding soil. The chemical potential of the soil is maintained through a combination of salt dissolution into the liquid phase that surrounds the tubular membrane; water transport away from the membrane through gravitational, vegetation uptake, and evaporation; and through the soil-water potential. When a support structure is used then water transport through the macroporous voids are through pore flow mechanisms. Various tubular membranes are described in co-pending U.S. Patent Publication No. 2017/0150685 entitled: "Desalination Membranes for Subsurface Irrigation", the entire contents of which is incorporated herein by reference. In an embodiment, the tubular membranes may be formed from an ACM5 TriSep reverse osmosis membrane available from Microdyn-Nadir US, Inc. of Goleta Calif.

The osmotic draw solution is, at a base form, a solution typically composed of salts that provide a high osmotic potential, high water solubility, and are easily separated or rejected by the membrane used. However, unlike a saline/brine wastewater, which may include numerous contaminants, the properties of the osmotic draw agent are known and controlled. Accordingly, the salt rejecting membranes may be designed based on the knowledge of the solute(s) of the draw solution. Among these properties are molecular weight, valence, hydrated size, diffusivity in the polymer making up the membrane active layer, and aqueous solubility as a function of temperature/pressure.

As noted, tubular membranes are constructed of a macroporous hydrophilic support 60 and an active membrane layer 50. The hydrophilic support will be manufactured of polypropylene (PP), polyvinyl difluride (PVDF) or another hydrophilic material. Note that the PP and PVDF are naturally hydrophobic, but will be made hydrophilic through surface modification or coating with hydrophilic end groups and/or through the short-term exposure to a caustic solution or alcohol. The hydrophilic nature of the support will minimize dewetting of the pore throats in the support structure which over time increases the tortuosity of the support structure and a reduction in water flux. Such dewetting occurs over time in hydrophobic membranes as a result of salt accumulation, in this case coming from diffusion from the surrounding soil, into the membrane support structure. This will maintain a high water conductivity across the support structure over the lifetime of the tubular membranes. Pores having a nominal diameter of less than 0.8 and more preferable about 0.2 microns will be integrated into the support to allow for high water diffusion from the active layer and into the soil. The size of the pores will also prevent the intrusion of soil and particulates into the membrane material matrix thereby providing the salt rejecting layer a level of projection from damage.

As noted, subsurface desalination type irrigation utilizes tubular, semi-permeable, and hydrophilic membrane materials in place of conventional drip tape. For use in such subsurface irrigation, water flux passing through the membrane has been determined to be a function of the membrane properties (free volume space, active layer thickness, active layer hydrophilicity, support layer thickness/hydrophilicity/porosity) and environmental variables (vapor pressure, soil texture, soil clay content, soil salinity, soil-water potential). Generally, fluxes increase as the water vapor pressure in the soil adjacent to the membrane decreases through soil drying. The total soil water potential and its specific components, the matric potential and osmotic potential, also influence the flux. For instance, it is noted that clayey and peaty soils have a lower matric potential than sand for the same soil water content, which translates to a lower vapor pressure and hence higher flux for clayey/peaty soils. Further, it has been determined that water flux increases with decreasing humidity in the soil. It should be noted that any system design for a subsurface irrigation system remains a combination of the differences in pressure heads between the water inside the tubular membrane, the soil matric potential, and a difference in vapor pressure between the soil and feed water inside the tubular membrane. Accordingly, any method of using or laying out a system is a complex interaction between the soil conditions and the membrane properties. Stated otherwise, the layout/design of a system is dependent on soil conditions as well as the evapotranspiration rate/water demand for crops. Such interrelation between the crop needs, soil conditions, membrane properties and/or length/diameter of subsurface tubing for a given area of irrigation is considered novel in and of itself.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A water treatment system for recovering water from tainted water, comprising:
 a forward osmosis system having a forward osmosis membrane separating a chamber of tainted water from a chamber of an osmotic draw solution, wherein water from the tainted water passes through the forward osmosis membrane to produce a diluted osmotic draw solution;
 at least a first tubular membrane buried within an irrigation field and fluidly connected to the forward osmosis system, the tubular membrane having a draw-solution rejecting active layer; and
 a pump for pumping moving the diluted osmotic draw solution from the forward osmosis system and through the tubular membrane, wherein water from the diluted osmotic draw solution passes through the active layer of the tubular membrane substantially free of the osmotic draw solution and into soil of the irrigation field.

2. The system of claim 1, further comprising:
 a reservoir of the osmotic draw solution, wherein an outlet of the reservoir is connected to an inlet of the chamber of the osmotic draw solution of the forward osmosis system.

3. The system of claim 2, further comprising:
 a fluid connection between an outlet of the tubular membrane and an inlet of the reservoir, wherein the osmotic draw solution returns to the reservoir after passing though the tubular membrane.

4. The system of claim 1, wherein the tubular membrane comprises said active layer and a macroporous support layer.

5. The system of claim 4, wherein the active layer comprises a pervaporation layer.

6. The system of claim 4, wherein the active layer comprises one of an ultra-filtration membrane and a nano-filtration membrane.

7. The system of claim 1, wherein the tubular membrane comprises a reverse osmosis membrane.

8. The system of claim 1, wherein the osmotic draw agent comprises a salt solution.

9. The system of claim 8, wherein said salt solution further comprises a fertilizer component.

10. The system of claim 9, wherein the active layer of the tubular membrane permits passage of at least a portion of the fertilizer component.

11. The system of claim 1, wherein a pressure within the tubular membrane is less than 30 psi.

12. The system of claim 1, wherein the pressure is less than 20 psi.

13. A method for recovering water from tainted water, comprising:
 passing a source of tainted water through forward osmosis system, wherein water from the tainted water passes through a forward osmosis membrane to dilute an osmotic draw solution producing a diluted draw solution; and
 pumping the diluted draw solution from the forward osmosis system through one or more tubular membranes buried within soil of a field, the tubular membranes each having a draw-solution rejecting active layer, wherein water in the diluted draw solution passes though the active layer into the soil.

14. The method of claim 13, wherein the water passing through the active layer at least partially re-concentrates the draw solution.

15. The method of claim 14, further comprising:
 subsequently utilizing the re-concentrated draw solution to draw water from the source of tainted water.

16. The method of claim 13, wherein the pumping comprises pumping the diluted draw solution through the tubular membranes at a pressure of less than 30 psi.

17. The method of claim 16, wherein the pumping comprises pumping at a pressure of less than 20 psi.

* * * * *